United States Patent
Ishida et al.

(10) Patent No.: US 9,618,340 B2
(45) Date of Patent: Apr. 11, 2017

(54) SURVEYING INSTRUMENT

(71) Applicant: Kabushiki Kaisha TOPCON, Tokyo-to (JP)

(72) Inventors: Takeshi Ishida, Tokyo-to (JP); Nobuyuki Nishita, Tokyo-to (JP); Jumpei Kochi, Tokyo-to (JP); Hiroyuki Nakabe, Tokyo-to (JP); Goro Iwasaki, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 121 days.

(21) Appl. No.: 14/740,578

(22) Filed: Jun. 16, 2015

(65) Prior Publication Data

US 2016/0010987 A1  Jan. 14, 2016

(30) Foreign Application Priority Data

Jul. 9, 2014  (JP) .................................. 2014-141306

(51) Int. Cl.
*G01C 15/00* (2006.01)
*G01C 17/34* (2006.01)

(52) U.S. Cl.
CPC ........... *G01C 17/34* (2013.01); *G01C 15/002* (2013.01)

(58) Field of Classification Search
CPC ........ G01C 5/00; G01C 15/00; G01C 15/006; G01C 15/002; G01C 15/02
USPC ......................................... 33/290, 292, 299
See application file for complete search history.

(56) References Cited

U.S. PATENT DOCUMENTS

| | | | | |
|---|---|---|---|---|
| 9,255,796 B2 * | 2/2016 | Kodaira | ................ | G01C 15/008 |
| 9,273,960 B2 * | 3/2016 | Kumagai | ............. | G01C 15/002 |
| 9,482,532 B2 * | 11/2016 | Kumagai | ............. | G01C 15/002 |

(Continued)

FOREIGN PATENT DOCUMENTS

| JP | 2003-240548 A | 8/2003 |
|---|---|---|
| JP | 2007-327862 A | 12/2007 |

*Primary Examiner* — Yaritza Guadalupe-McCall
(74) *Attorney, Agent, or Firm* — Nields, Lemack & Frame, LLC

(57) ABSTRACT

The invention provides a surveying instrument, comprising a frame unit rotatable in a horizontal direction, a telescope unit as mounted rotatably in a vertical direction on the frame unit and further for sighting an object to be measured, a horizontal driving unit for rotating and driving the frame unit in a horizontal direction, a vertical driving unit for rotating the telescope unit in a vertical direction, a horizontal angle measuring unit for detecting a horizontal angle of the frame unit, a vertical angle measuring unit for detecting a vertical angle of the telescope unit and a control device, wherein the control device is adapted to calculate a solar altitude at a time moment by setting up coordinates of where the surveying instrument is installed and the time moment, and to make the telescope unit to set to the solar altitude as calculated by controlling the vertical driving unit, to control the horizontal driving unit, to execute searching of the sun by horizontally rotating the frame unit at the solar altitude as set up, to capture the sun, to sight the sun, to detect a horizontal angle under the sighted condition based on the horizontal angle measuring unit, and to survey a true north based on the horizontal angle as detected.

12 Claims, 4 Drawing Sheets

(56) References Cited

U.S. PATENT DOCUMENTS

| | | | |
|---|---|---|---|
| 2016/0010985 A1* | 1/2016 | Ishida | G01C 1/04 |
| | | | 356/139.01 |
| 2016/0010987 A1* | 1/2016 | Ishida | G01C 17/34 |
| | | | 33/292 |
| 2016/0102977 A1* | 4/2016 | Ishida | G01C 15/008 |
| | | | 33/292 |

* cited by examiner

SURVEYING INSTRUMENT

BACKGROUND OF THE INVENTION

The present invention relates to a surveying instrument, by which it is possible to perform a surveying operation automatically on true north.

In a case where a surveying instrument is installed for the purpose of performing a surveying operation, the true north is measured for setting a sighting direction of the surveying instrument. As one of the methods to determine azimuth at a position of installation, a method is known, by which the true north is surveyed by utilizing the sun.

When a position (latitude and longitude) where the surveying instrument is installed is already known, a sighting is performed from the position of installation toward the sun by using a telescope. A directional angle of the sun when the sighting is performed is obtained, and the true north can be surveyed based on the directional angle and time moment when sighting is performed.

Conventionally, when the sighting is performed on the sun, a surveying operator directs the telescope toward the sun. However, it is dangerous for the operator to directly perform sighting by a telescope, and by mounting a filter on the telescope and attenuating the light by the filter, the sighting is performed on the sun. For this reason, when the sighting is performed on the sun, an operation of mounting a filter for attenuating the light is always involved.

Further, in the operation of directing the telescope toward the sun, the operator himself must face directly toward the sun and there is a possibility of looking directly at the sun. Looking directly at the sun itself is not desirable and in the true north surveying, the operation to perform sighting on the sun has been regarded as an operation, which must be carried out with care.

SUMMARY OF THE INVENTION

It is an object of the present invention to provide a surveying instrument, by which it is possible to perform the true north surveying safely and reliably by a surveying operator without sighting a sun.

To attain the object as described above, a surveying instrument according to the present invention comprises a frame unit rotatable in a horizontal direction, a telescope unit as mounted rotatably in a vertical direction on the frame unit and further for sighting an object to be measured, a horizontal driving unit for rotating and driving the frame unit in a horizontal direction, a vertical driving unit for rotating the telescope unit in a vertical direction, a horizontal angle measuring unit for detecting a horizontal angle of the frame unit, a vertical angle measuring unit for detecting a vertical angle of the telescope unit and a control device, wherein the control device is adapted to calculate a solar altitude at a time moment by setting up coordinates of where the surveying instrument is installed and the time moment, and to make the telescope unit to set to the solar altitude as calculated by controlling the vertical driving unit, to control the horizontal driving unit, to execute searching of the sun by horizontally rotating the frame unit at the solar altitude as set up, to capture the sun, to sight the sun, to detect a horizontal angle under the sighted condition based on the horizontal angle measuring unit, and to survey a true north based on the horizontal angle as detected.

Further, in the surveying instrument according to the present invention, the telescope unit has a telescope for sighting an object to be measured and an image pickup unit for acquiring an image in a sighting direction through the telescope, wherein the control device captures the sun by the telescope and makes the telescope to sight the sun based on an image acquired through the telescope.

Further, in the surveying instrument according to the present invention, the telescope unit has a telescope for sighting an object to be measured, an image pickup unit for acquiring an image in a sighting direction through the telescope and a wide angle camera having an optical axis which is in a known relationship with an optical axis of the telescope and having a wider field angle than the telescope, wherein the control device captures the sun by the wide angle camera and sights the sun by the telescope based on the image acquired by the wide angle camera and the known relationship.

Further, in the surveying instrument according to the present invention, the telescope unit has a telescope for sighting an object to be measured, an image pickup unit for acquiring an image in a sighting direction through the telescope and a wide angle camera having an optical axis which is in a known relationship with an optical axis of the telescope and having a wider field angle than the telescope, wherein the control device captures the sun by the wide angle camera and sights the sun by the wide angle camera based on an image acquired by the wide angle camera.

Further, in the surveying instrument according to the present invention, a sighting position of the sun is set on a photodetection element of the wide angle camera, the sighting position of the sun and an optical axis of the telescope are in a known relationship and the sighting position of the sun is a known position deviated from a field of view of the telescope, wherein the control device detects a center of an image of the sun from an image acquired by the wide angle camera, controls the horizontal driving unit and the vertical driving unit so that the center of the image of the sun coincides with the sighting position of the sun and is adapted to determine the true north based on a time moment when the center of the image of the sun coincides with the sighting position of the sun, a horizontal angle as detected by a horizontal angle measuring unit, a vertical angle as detected by a vertical angle measuring unit, the sighting position of the sun with respect to the optical axis of the telescope and coordinates where the surveying instrument is installed.

Furthermore, the surveying instrument according to the present invention further comprises a GPS wherein coordinates and time of measurement of the surveying instrument are obtained by the GPS.

According to the present invention, the surveying instrument comprises a frame unit rotatable in a horizontal direction, a telescope unit as mounted rotatably in a vertical direction on the frame unit and further for sighting an object to be measured, a horizontal driving unit for rotating and driving the frame unit in a horizontal direction, a vertical driving unit for rotating the telescope unit in a vertical direction, a horizontal angle measuring unit for detecting a horizontal angle of the frame unit, a vertical angle measuring unit for detecting a vertical angle of the telescope unit and a control device, wherein the control device is adapted to calculate a solar altitude at a time moment by setting up coordinates of where the surveying instrument is installed and the time moment, and to make the telescope unit to set to the solar altitude as calculated by controlling the vertical driving unit, to control the horizontal driving unit, to execute searching of the sun by horizontally rotating the frame unit at the solar altitude as set up, to capture the sun, to sight the sun, to detect a horizontal angle under the sighted condition based on the horizontal angle measuring unit, and to survey a true north based on the horizontal angle as detected. As a result, by simply setting up coordinates and a time moment of installation of the surveying instrument, the surveying operator can easily perform the true north surveying without sighting a telescope.

Further, according to the present invention, in the surveying instrument, the telescope unit has a telescope for sighting an object to be measured and an image pickup unit for acquiring an image in a sighting direction through the telescope, wherein the control device captures the sun by the telescope and makes the telescope to sight the sun based on an image acquired through the telescope. As a result, the sun can be sighted in a simple manner by the telescope.

Further, according to the present invention, in the surveying instrument, the telescope unit has a telescope for sighting an object to be measured, an image pickup unit for acquiring an image in a sighting direction through the telescope and a wide angle camera having an optical axis which is in a known relationship with an optical axis of the telescope and having a wider field angle than the telescope, wherein the control device captures the sun by the wide angle camera and sights the sun by the telescope based on the image acquired by the wide angle camera and the known relationship. As a result, accuracy is not necessary when capturing the sun, and sighting of the sun can be performed in a simple manner.

Further, according to the present invention, in the surveying instrument, the telescope unit has a telescope for sighting an object to be measured, an image pickup unit for acquiring an image in a sighting direction through the telescope and a wide angle camera having an optical axis which is in a known relationship with an optical axis of the telescope and having a wider field angle than the telescope, wherein the control device captures the sun by the wide angle camera and sights the sun by the wide angle camera based on an image acquired by the wide angle camera. As a result, the accuracy is not necessary when capturing the sun, and sighting of the sun can be performed in a simple manner.

Further, according to the present invention, in the surveying instrument, a sighting position of the sun is set on a photodetection element of the wide angle camera, the sighting position of the sun and an optical axis of the telescope are in a known relationship and the sighting position of the sun is a known position deviated from a field of view of the telescope, wherein the control device detects a center of an image of the sun from an image acquired by the wide angle camera, controls the horizontal driving unit and the vertical driving unit so that the center of the image of the sun coincides with the sighting position of the sun and is adapted to determine the true north based on a time moment when the center of the image of the sun coincides with the sighting position of the sun, a horizontal angle as detected by a horizontal angle measuring unit, a vertical angle as detected by a vertical angle measuring unit, the sighting position of the sun with respect to the optical axis of the telescope and coordinates where the surveying instrument is installed. As a result, it is not necessary to sight the sun directly by a telescope with high magnification, and this contributes to the prevention of deterioration and damage of an image pickup device.

Furthermore, according to the present invention, the surveying instrument further comprises a GPS wherein coordinates and time of measurement of the surveying instrument are obtained by the GPS. As a result, inputting of coordinates and time of measurement of the surveying instrument can be omitted, and it is possible to perform the true north surveying in a more easier manner.

DETAILED DESCRIPTION OF THE PREFERRED EMBODIMENT

Description will be given below on an embodiment of the present invention by referring to the attached drawings.

Figure 1:
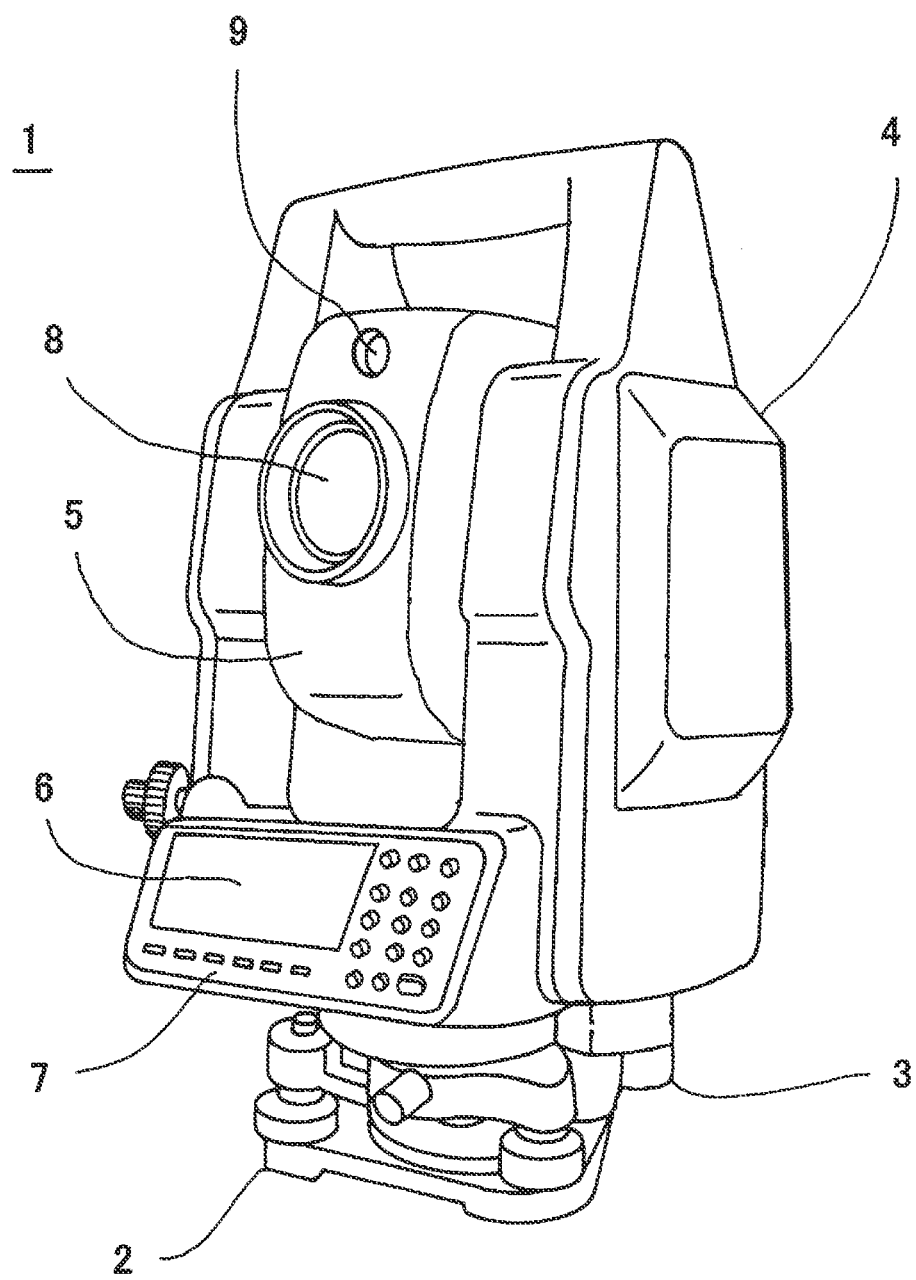
FIG. 1 is a schematical external view of a surveying instrument according to an embodiment of the present invention.
Figure 2:
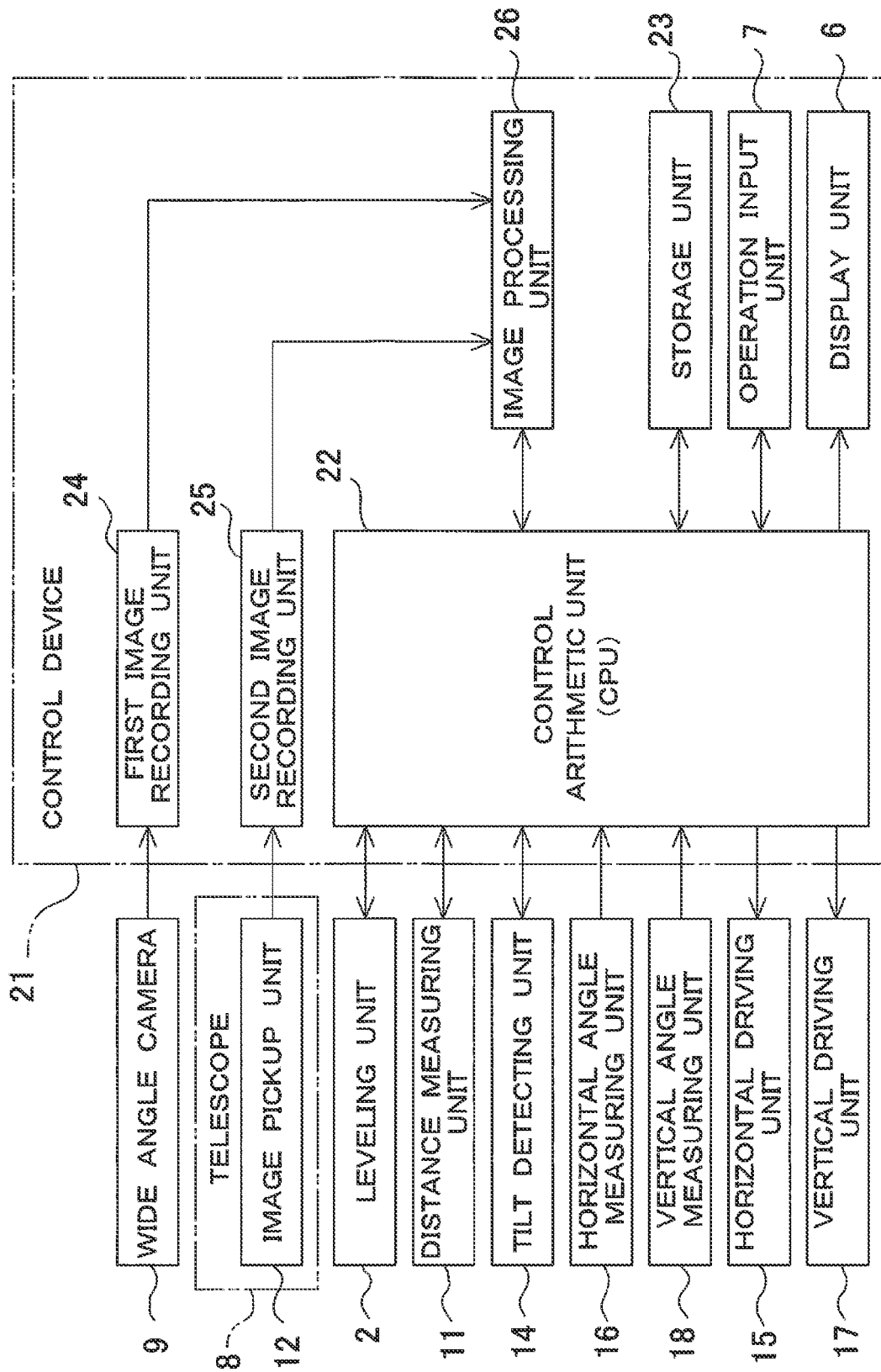
FIG. 2 is a block diagram to show an approximate arrangement of the surveying instrument.

FIG. 1 and FIG. 2 shows a surveying instrument 1, to which the present invention is applied. It is to be noted that the surveying instrument 1 as used is a total station, for instance, and has a tracking function. A pulsed laser beam is projected towards a measuring point as a distance measuring light, a reflected light (hereinafter referred as "a reflection light") of the distance measuring light from the measuring point is received, and a distance is measured for each pulse of the light. By taking an average value of the results of distance measurement, the measurement of distance is performed with high precision.

As shown in FIG. 1, the surveying instrument 1 primarily comprises a leveling unit 2 mounted on a tripod (not shown), a base unit 3 mounted on the leveling unit 2, a frame unit 4 rotatably mounted around a vertical axis as a center on the base unit 3 and a telescope unit 5 rotatably mounted around a horizontal axis as a center on the frame unit 4.

The frame unit 4 comprises a display unit 6 and an operation input unit 7. The telescope unit 5 has a telescope 8 for sighting an object to be measured and a distance measuring unit 11, which commonly shares an optical system of the telescope 8. Further, the telescope unit 5 has an image pickup unit 12 for acquiring an image in a sighting direction through the optical system of the telescope 8. Also, the telescope unit 5 comprises a wide angle camera 9. The wide angle camera 9 has an optical axis running in parallel to an optical axis of the telescope 8, and can acquire a wide angle image in the sighting direction or in an approximately sighting direction of the telescope 8.

A field angle of the telescope 8 is 1°, for instance, and a field angle of the wide angle camera 9 is 15° to 30°, for instance. Further, although the optical axis of the telescope 8 is different from the optical axis of the wide angle camera 9, a distance between these optical axes is already known, and a deviation of the sighting direction between the wide angle camera 9 and the telescope 8 can be corrected by calculation.

Each of the wide angle camera 9 and the image pickup unit 12 outputs a picked up image as a digital image signal. Photodetection element of each of the wide angle camera 9 and the image pickup unit 12 is a CCD, a CMOS, etc., for instance, which is an aggregate of pixels and so arranged that a position of the pixel to be received can be specified and that a field angle can be detected from the position of the pixel to be received.

Referring to FIG. 2, description will be given on a basic arrangement of the surveying instrument 1.

As described above, the telescope unit 5 houses the distance measuring unit 11, which commonly shares an optical system of the telescope 8. The distance measuring unit 11 emits a pulsed laser beam as a distance measuring light through the optical system and receives a reflection light from an object to be measured through the optical system, and performs an electro-optical distance measurement to the object to be measured based on the reflection light as received.

In a case where the object to be measured is a prism, the distance measuring unit 11 can perform measurement in a prism measurement mode. Further, in a case where the object to be measured is not a prism, the distance measuring unit 11 can perform measurement in a non-prism measurement mode. And a measurement mode can be switched over corresponding to the object to be measured.

On the frame unit 4, a horizontal driving unit 15 for rotating the frame unit 4 in a horizontal direction is provided, and a horizontal angle measuring unit 16 for detecting a horizontal rotation angle and for detecting a horizontal angle of a sighting direction is provided with respect to the base unit 3 of the frame unit 4. Further, on the frame unit 4, a vertical driving unit 17 is provided, which rotates around the telescope unit 5 with a horizontal axis as a center and a vertical angle measuring unit 18 is provided, which detects a vertical angle of the telescope unit 5 and measures a vertical angle in the sighting direction.

Further, on the frame unit 4, a tilt detecting unit 14 is provided and the tilt detecting unit 14 detects a tilt or a horizontality of the frame unit 4.

A control device 21 is housed in the frame unit 4. Based on a detection result of the tilt detecting unit 14, the control device 21 controls the leveling unit 2 and levels the frame unit 4 in a horizontal direction.

Further, the control unit 21 controls the driving of the horizontal driving unit 15 and rotates the frame unit 4 in a horizontal direction, and further, controls the driving of the vertical driving unit 17 and rotates the telescope unit 5 in an elevation direction. By cooperative movement of a rotation in the horizontal direction and a rotation in the elevation direction, the telescope unit 5 is directed towards a predetermined direction.

Further, the control device 21 detects, tracks and executes the true north surveying of the sun based on the image acquired by the wide angle camera 9 and controls to track the object to be measured based on the image acquired by the image pickup unit 12. Further, based on the image acquired by the wide angle camera 9 and on the image acquired by the image pickup unit 12, the control device 21 carries out a searching for capturing the object to be measured in the image (in a field of view of a telescope) before starting the tracking, or in a case where the object to be measured is deviated from the image while tracking, the searching for capturing in the image again is carried out.

Further, the control device 21 performs distance measurement at a predetermined measuring point by controlling the distance measuring unit 11 in a standstill condition or while tracking.

Referring to FIG. 2, further description will be given on the control device 21.

The control device 21 is made up of a control arithmetic unit 22, a storage unit 23, a first image recording unit 24 for recording images acquired by the wide angle camera 9, a second image recording unit 25 for recording images acquired by the image pickup unit 12, an image processing unit 26 for performing image processing such as a specifying of a measuring point or an object to be measured based on the image acquired by the wide angle camera 9 and the image acquired by the image pickup unit 12, the display unit 6 for displaying measurement results and measurement conditions, and the operation input unit 7 for inputting various types of commands such as measurement starting or the like or for inputting data necessary for the measurement.

In the storage unit 23, various types of programs are stored. These programs include: a sequence program for executing the measurement, an image display program for displaying on the image processing unit 26, a calculation program for calculating a solar altitude (vertical angle) based on coordinate values (latitude and longitude) and a time moment and for executing calculations necessary for the measurement (distance measurement and angle measurement), an image processing program for performing image processing on the images acquired by the wide angle camera 9 and the image pickup unit 12, a true north surveying program for calculating the position of the sun from the images as processed and executing the true north surveying, a distance measuring program for measuring a distance to the measuring point and for measuring the distance by tracking the object to be measured, a searching program for capturing the object to be measured in the images, and other programs.

Further, the results of measurement are inputted to the control arithmetic unit 22 from the distance measuring unit 11, the horizontal angle measuring unit 16 and the vertical angle measuring unit 18. The control arithmetic unit 22 executes the measurement of distance, the vertical angle and the horizontal angle according to the sequence program, the arithmetic program, the distance measuring program, etc., and calculates a solar altitude according to the solar altitude calculating program. Further, it is so arranged that the control arithmetic unit 22 carries out a searching operation by driving and controlling the horizontal driving unit 15 and the vertical driving unit 17, stores the results of measurement in the storage unit 23 and displays on the display unit 6 according to the image display program or the like.

The image processing program makes the image processing unit 26 to execute an image processing such as an extraction of the measuring point or the object to be measured based on the image acquired by the wide angle camera 9 and the image acquired by the image pickup unit 12.

Further, the control arithmetic unit 22 can execute a normal surveying mode with respect to the object to be measured according to the distance measurement program and a true north surveying mode to perform the true north surveying according to the true north surveying program. By selecting a surveying mode from the operation input unit 7, an operation as required necessary for the true north surveying can be executed.

Description will be given below on an operation in a case where the true north surveying is performed by the surveying instrument 1 according to the present embodiment.

The surveying instrument 1 is installed at a known point, i.e. at a point where a latitude and a longitude are already known, and leveling is performed by the leveling unit 2.

The true north surveying mode is selected by the operation input unit 7. It is to be noted that in a case where the true north surveying mode is selected, a light attenuation filter (not shown) is mounted on each of the telescope 8 and the wide angle camera 9 respectively.

The latitude and the longitude of the position of installation and the time of measurement are inputted to the control device 21 by the operation input unit 7. It is to be noted that in a case where the surveying instrument 1 is provided with a GPS, an installation coordinate of the surveying instrument 1 is obtained from the GPS and the time moment of measurement may be obtained from the GPS.

Figure 3:
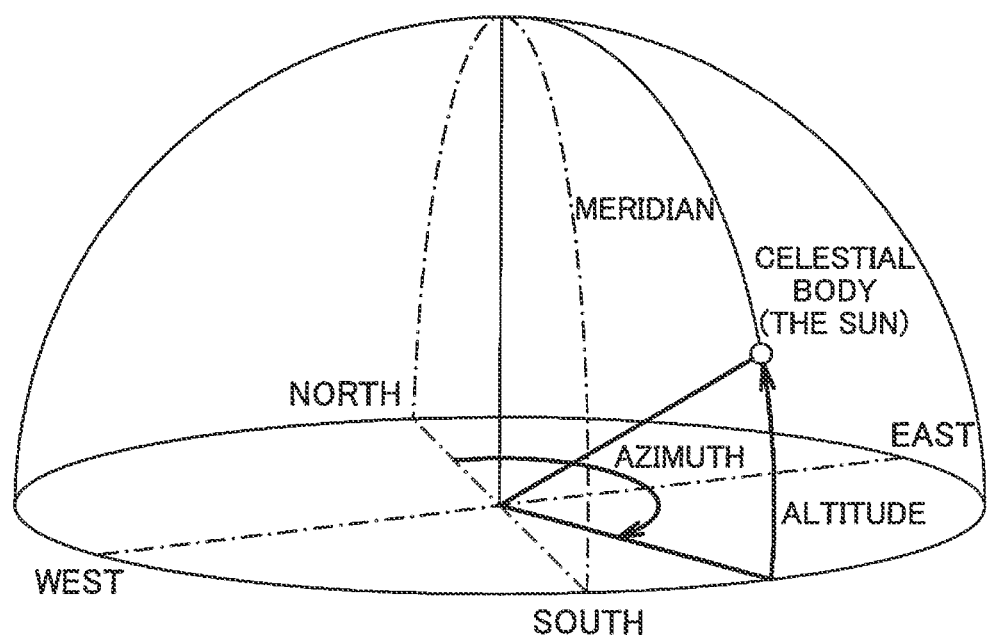
FIG. 3 is an explanatory drawing relating to a true north surveying.

When the latitude, the longitude and the time of measurement are inputted, the control device 21 calculates a solar altitude. The relation between the latitude, the longitude, the altitude and an azimuth is shown in FIG. 3. In FIG. 3, a central position is a position where the surveying instrument 1 is installed.

Figure 4:
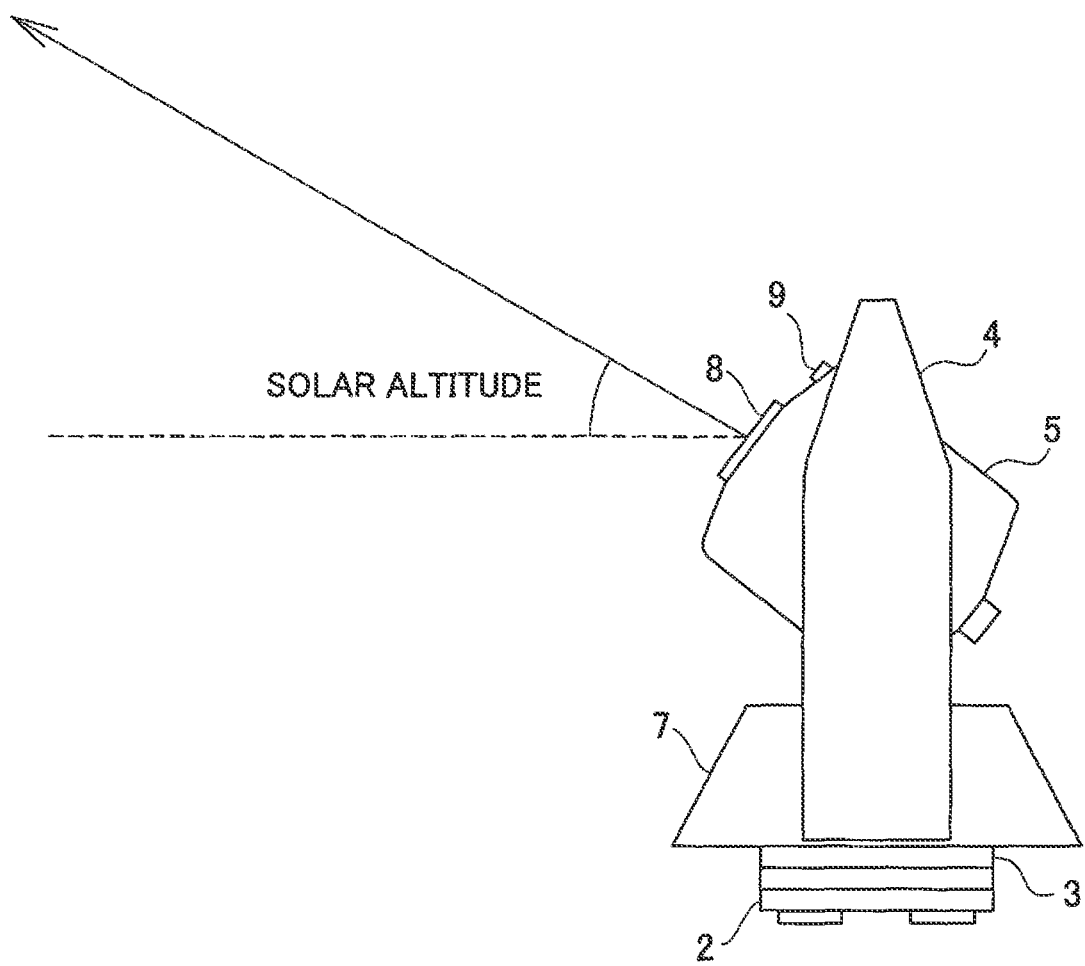
FIG. 4 is an explanatory drawing of a condition where sighting is performed on the sun by the surveying instrument.

When the solar altitude is calculated, the vertical driving unit 17 rotates the telescope unit 5 in a vertical direction. Based on the detection results from the vertical angle measuring unit 18, a vertical angle in a sighting direction of the telescope 8 is made to coincide with the solar altitude (see FIG. 4).

When the vertical angle from the vertical angle measuring unit 18 coincides with the solar altitude, the control device 21 issues a control signal to the horizontal driving unit 15, and the frame unit 4 is rotated in a horizontal direction by the horizontal driving unit 15 under a condition where the vertical angle of the telescope unit 5 is maintained.

As shown in FIG. 3, if the frame unit 4 is rotated horizontally by 360° under a condition where the sighting direction coincides with the solar altitude, the sun can be captured without fail in the field of view of the telescope 8 at some point of the horizontal rotation by 360° (searching of the sun). When the sun is captured within the field of view of the telescope 8, the surveying instrument 1 executes a tracking function and can sight the sun accurately. It is possible to judge as to whether the telescope 8 has captured the sun or not based on the image as acquired by the image pickup unit 12.

The sun is accurately sighted by the telescope 8 and a horizontal angle at the sighted position is measured by the horizontal angle measuring unit 16. Further, the time at a moment when accurately sighted is obtained from the GPS. The control device 21 is able to survey the true north by counting back an azimuth angle (see FIG. 3) based on the time at a moment of sighting, the horizontal angle measured by the horizontal angle measuring unit 16 and the vertical angle measured by the vertical angle measuring unit 18.

It is to be noted that the true north surveying as described above is performed by sighting the sun by the telescope 8, while the true north surveying can be surveyed based on the image acquired by the wide angle camera 9.

The relation between an optical axis of the wide angle camera 9 and an optical axis of the telescope 8 is already known. For instance, the optical axis of the wide angle camera 9 and the optical axis of the telescope 8 run parallel to each other, and a distance between the two optical axes is already known.

In a case where the true north surveying is performed by using the wide angle camera 9, the sun can be captured by the wide angle camera 9 if the direction is approximately adequate since a field of view of the wide angle camera 9 is wide.

When the solar altitude is calculated by the control device 21, the vertical driving unit 17 rotates the telescope unit 5 in the vertical direction based on a calculation result, and the vertical angle in the sighting direction of the wide angle camera 9 is coincided with the solar altitude. Under a condition where the vertical angle of the telescope unit 5 is maintained, the frame unit 4 is rotated in the horizontal direction by the horizontal driving unit 15, and a searching of the sun is executed by the wide angle camera 9.

When the sun is captured by the wide angle camera 9, the optical axis of the telescope 8 is made coincident with the sun (sighting of the sun by the telescope 8) based on the position of the sun on the image of the wide angle camera 9 since the relation between the optical axis of the wide angle camera 9 and the optical axis of the telescope 8 is already known.

That is, the sun is searched by the wide angle camera 9 and the sun is sighted by the telescope 8 based on the searching result by the wide angle camera 9. Since the wide angle camera 9 is designed to have a wide angle, the searching of the sun can be executed at a high speed and the sighting of the sun can be carried out efficiently and at high speed.

Next, the true north surveying can be executed by the wide angle camera 9 only.

The control device 21 calculates a solar altitude. Based on the solar altitude thus calculated, the vertical driving unit 17 rotates the telescope unit 5 in a vertical direction and makes a vertical angle in a sighting direction of the wide angle camera 9 to coincide with the solar altitude. Under a condition where a vertical angle of the telescope unit 5 is maintained, the frame unit 4 is rotated in a horizontal direction by the horizontal driving unit 15 and a searching of the sun is executed by the wide angle camera 9.

On the image of the wide angle camera 9, a sighting position where the sun is to be sighted by the wide angle camera 9 is set up. The sighting position is preferably a position of an optical axis of the wide angle camera 9. Further, the sighting position is set up as deviated from the sighting position of the telescope 8 (optical axis of the telescope 8).

Figure 5:
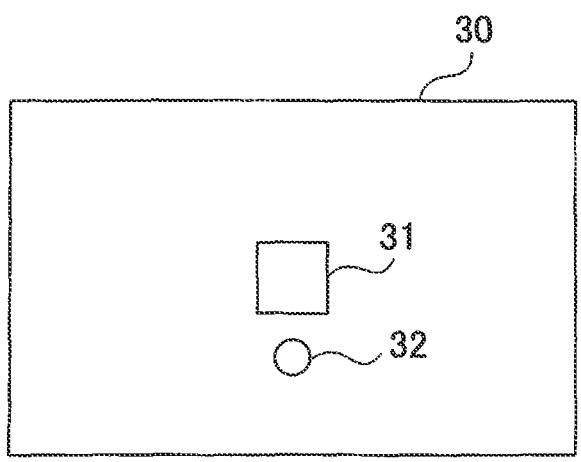
FIG. 5 is an explanatory drawing to show a relationship between a field of view of a telescope on a photodetection element of a wide angle camera and a sighting position of the sun in the present embodiment.

As shown in FIG. 5, the relation between a sighting position of the sun of the wide angle camera 9 and the sighting position of the telescope 8 is such that an image 32 of the sun deviates entirely from a field of view 31 of the telescope 8. Further, a deviation amount of the sighting position of the sun from the sighting position of the telescope 8 is already known, and the amount is at least an amount, which is deviated from the field of view 31 of the telescope 8. Since the deviation amount between the sighting position of the sun and the sighting position of the telescope 8 is already known, the sighting position of the sun can be corrected so as to coincide with the sighting position of the telescope 8 by calculation.

FIG. 5 shows a condition where the sun is finally sighted by the wide angle camera 9. The sighting position of the sun may be deviated in any direction with respect to the sighting position of the telescope 8, but is deviated in a vertical direction for the purpose of decreasing a calibration error of a horizontal angle because the accuracy of the horizontal angle is important in the true north surveying.

Further, it is so arranged that an image taken by the wide angle camera 9 is displayed on the display unit 6 and it can be easily confirmed by an image 30 of the display unit 6 as to whether the sun is captured by the wide angle camera 9 or not.

The image processing unit 26 extracts the image 32 of the sun by processing an image from the first image recording unit 24 and detects the central position of the image 32 of the sun. The image processing unit 26 compares the central position of the image 32 of the sun with the sighting position of the sun, calculates the deviation amount and a deviation direction between the central position of the image 32 of the sun and the sighting position of the sun, and the calculation result is inputted to the control arithmetic unit 22.

Based on the deviation amount and the deviation direction as inputted from the image processing unit 26, the leveling unit 2 drives the horizontal driving unit 15 and the vertical driving unit 17 and coincides the position of the image 32 of the sun as detected with the sighting position of the sun.

The time moment when coincidence is made, a horizontal angle detected by the horizontal angle measuring unit 16 and a vertical angle detected by the vertical angle measuring unit 18 are captured.

Regarding the time moment when coincidence is made and the horizontal angle and the vertical angle as detected, the horizontal angle and the vertical angle are corrected based on the deviation amount between the sighting position of the sun and the sighting position of the telescope 8, and further, the true north is measured based on the latitude and the longitude of the position of installation. Therefore, the true north surveying can be executed under a condition where the telescope 8 is not sighting the sun.

Further, in a case where the true north surveying is executed by the wide angle camera 9 only, it can be so arranged that the sun does not come into the field of view of the telescope 8.

On the photodetection element of the wide angle camera 9, a range corresponding to the field of view 31 of the telescope 8 is set as a photodetection prohibiting zone.

The control arithmetic unit 22 calculates a route to move the central position of the image 32 of the sun to the sighting position of the sun from the central position of the sun and the sighting position of the sun.

Further, in a case where the central position of the sun on the photodetection element is coincided with the sighting position of the sun and in a case where the central position of the image 32 of the sun passes through the field of view 31 of the telescope 8 when moved by the shortest distance, the control arithmetic unit 22 calculates a route so as to reach the sighting position of the sun by avoiding the field of view 31 of the telescope 8 and performs driving and controlling on the horizontal driving unit 15 and the vertical angle measuring unit 18 based on the calculated route.

Or, an arbitrary shutter such as an electrical, a mechanical, etc. may be provided in an optical system of the telescope 8, and it may be so arranged that an optical path of the telescope 8 is intercepted in the true north surveying mode of the wide angle camera 9.

In the present embodiment, when the true north surveying is performed, the surveying instrument 1 automatically searches the sun by simply inputting a coordinate data and a time moment in the surveying instrument 1 and the true north surveying is executed automatically. Further, the processing condition of the true north surveying and the result of the true north surveying can be confirmed by the display unit 6, and this contributes to the execution of higher efficiency.

By setting the true north surveying mode, incoming of a sunlight to the telescope 8 with high magnification can be prevented. As a result, the incoming of a strong light to a photodetection element of the image pickup unit 12 can be restrained, and deterioration and damage of the photodetection element can be prevented.

It is needless to say that, when normal surveying mode is selected by the operation input unit 7 at the start of the measurement, it is possible to perform a distance measurement and an angle measurement on an object to be measured or the measurement by tracking the object to be measured.

The invention claimed is:

1. A surveying instrument comprising a frame unit rotatable in a horizontal direction, a telescope unit as mounted rotatably in a vertical direction on said frame unit and further for sighting an object to be measured, a horizontal driving unit for rotating and driving said frame unit in a horizontal direction, a vertical driving unit for rotating said telescope unit in a vertical direction, a horizontal angle measuring unit for detecting a horizontal angle of said frame unit, a vertical angle measuring unit for detecting a vertical angle of said telescope unit and a control device, wherein said control device is adapted to calculate a solar altitude at a time moment by setting up coordinates of where said surveying instrument is installed and said time moment, and to make said telescope unit to set to the solar altitude as calculated by controlling said vertical driving unit, to control said horizontal driving unit, to execute searching of the sun by horizontally rotating said frame unit at the solar altitude as set up, to capture the sun, to sight the sun, to detect a horizontal angle under the sighted condition based on said horizontal angle measuring unit, and to survey a true north based on the horizontal angle as detected.

2. A surveying instrument according to claim 1, wherein said telescope unit has a telescope for sighting an object to be measured and an image pickup unit for acquiring an image in a sighting direction through said telescope, wherein said control device captures the sun by said telescope and makes said telescope to sight the sun based on an image acquired through said telescope.

3. A surveying instrument according to claim 2, further comprising a GPS wherein coordinates and time of measurement of said surveying instrument are obtained by said GPS.

4. A surveying instrument according to claim 1, wherein said telescope unit has a telescope for sighting an object to be measured, an image pickup unit for acquiring an image in a sighting direction through said telescope and a wide angle camera having an optical axis which is in a known relationship with an optical axis of said telescope and having a wider field angle than said telescope, wherein said control device captures the sun by said wide angle camera and sights the sun by said telescope based on the image acquired by said wide angle camera and said known relationship.

5. A surveying instrument according to claim 4, wherein a sighting position of the sun is set on a photodetection element of said wide angle camera, said sighting position of the sun and an optical axis of said telescope are in a known relationship and said sighting position of the sun is a known position deviated from a field of view of said telescope, wherein said control device detects a center of an image of the sun from an image acquired by said wide angle camera, controls said horizontal driving unit and said vertical driving unit so that the center of said image of the sun coincides with said sighting position of the sun and is adapted to determine the true north based on a time moment when the center of said image of the sun coincides with said sighting position of the sun, a horizontal angle as detected by a horizontal angle measuring unit, a vertical angle as detected by a vertical angle measuring unit, said sighting position of the sun with respect to said optical axis of said telescope and coordinates where said surveying instrument is installed.

6. A surveying instrument according to claim 5, further comprising a GPS wherein coordinates and time of measurement of said surveying instrument are obtained by said GPS.

7. A surveying instrument according to claim 4, further comprising a GPS wherein coordinates and time of measurement of said surveying instrument are obtained by said GPS.

8. A surveying instrument according to claim 1, wherein said telescope unit has a telescope for sighting an object to be measured, an image pickup unit for acquiring an image in a sighting direction through said telescope and a wide angle camera having an optical axis which is in a known relationship with an optical axis of said telescope and having a wider field angle than said telescope, wherein said control device captures the sun by said wide angle camera and sights the sun by said wide angle camera based on an image acquired by said wide angle camera.

9. A surveying instrument according to claim 8, wherein a sighting position of the sun is set on a photodetection element of said wide angle camera, said sighting position of the sun and an optical axis of said telescope are in a known relationship and said sighting position of the sun is a known position deviated from a field of view of said telescope, wherein said control device detects a center of an image of the sun from an image acquired by said wide angle camera, controls said horizontal driving unit and said vertical driving unit so that the center of said image of the sun coincides with said sighting position of the sun and is adapted to determine the true north based on a time moment when the center of said image of the sun coincides with said sighting position of the sun, a horizontal angle as detected by a horizontal angle measuring unit, a vertical angle as detected by a vertical angle measuring unit, said sighting position of the sun with respect to said optical axis of said telescope and coordinates where said surveying instrument is installed.

10. A surveying instrument according to claim 9, further comprising a GPS wherein coordinates and time of measurement of said surveying instrument are obtained by said GPS.

11. A surveying instrument according to claim 8, further comprising a GPS wherein coordinates and time of measurement of said surveying instrument are obtained by said GPS.

12. A surveying instrument according to claim 1, further comprising a GPS wherein coordinates and time of measurement of said surveying instrument are obtained by said GPS.

* * * * *